United States Patent [19]

Kielsmeier

[11] 4,339,468
[45] Jul. 13, 1982

[54] METHOD OF PREPARING PASTA FILATA CHEESE FOR BRINING AND CUTTING

[75] Inventor: Lester O. Kielsmeier, Lakewood, Colo.

[73] Assignee: Leprino Foods Company, Denver, Colo.

[21] Appl. No.: 221,331

[22] Filed: Dec. 29, 1980

[51] Int. Cl.³ ............................................ A23C 19/00
[52] U.S. Cl. .................................... 426/582; 99/535; 425/67; 426/506; 426/516; 426/517
[58] Field of Search ................. 426/582, 36, 506, 516, 426/517; 99/452, 535; 264/145; 425/67, 61

[56] References Cited

U.S. PATENT DOCUMENTS 4,091,721  5/1978  Cosmi .................................. 426/36
4,226,888 10/1980  Siecker ................................ 426/36

Primary Examiner—Raymond N. Jones
Assistant Examiner—George C. Yeung

[57] ABSTRACT

A method and apparatus is provided for preparing pasta filata cheese for brining and cutting. The warm mixed cheese is extruded in a continuous ribbon which is discharged into a channel filled with cold brine. The brine and ribbon flow together through the channel, and the ribbon is mechanically removed therefrom on a continuous basis. After removal from the brine channel, the ribbon can be cut into long lengths for brining, and thereafter into the final size for packaging.

9 Claims, 14 Drawing Figures

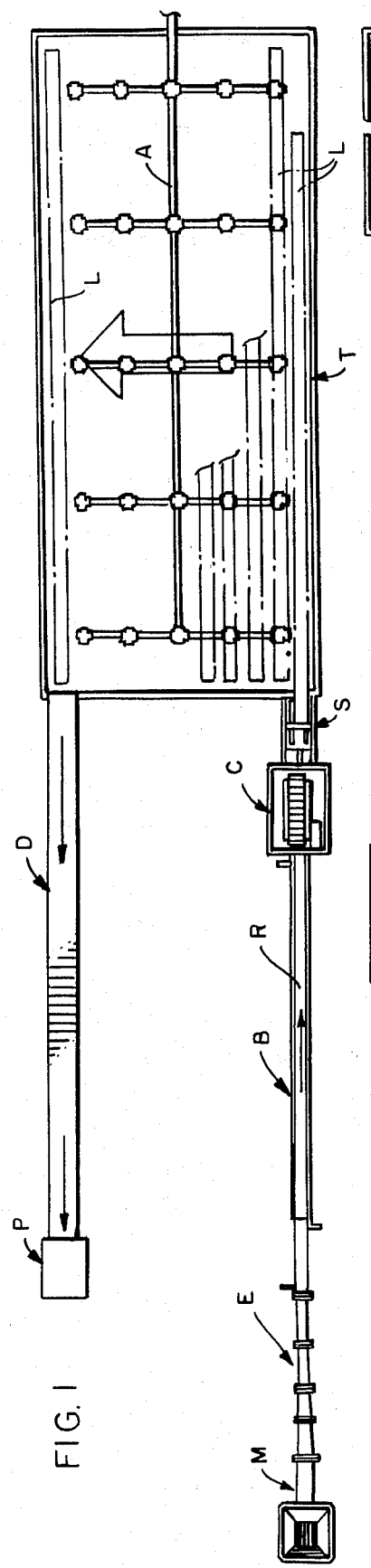
FIG. 1
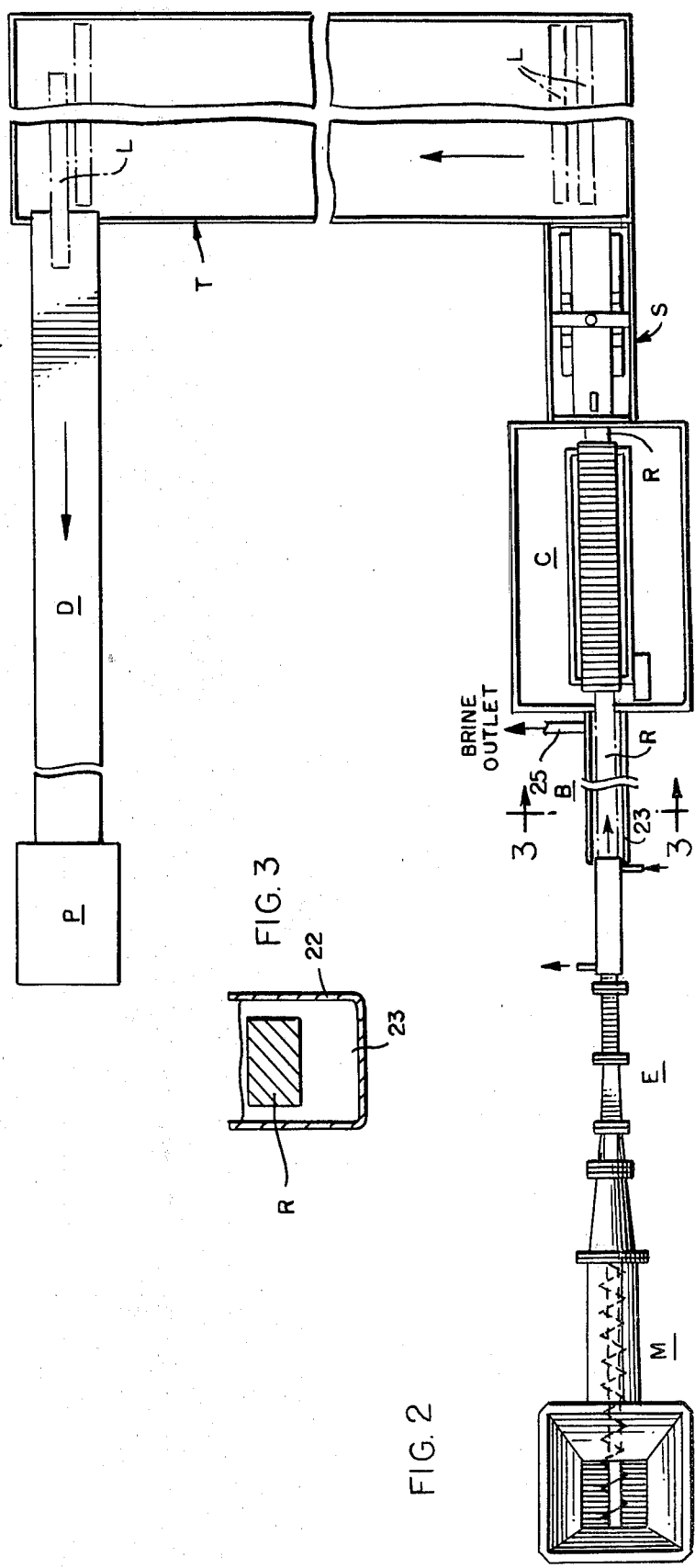
FIG. 2
FIG. 3

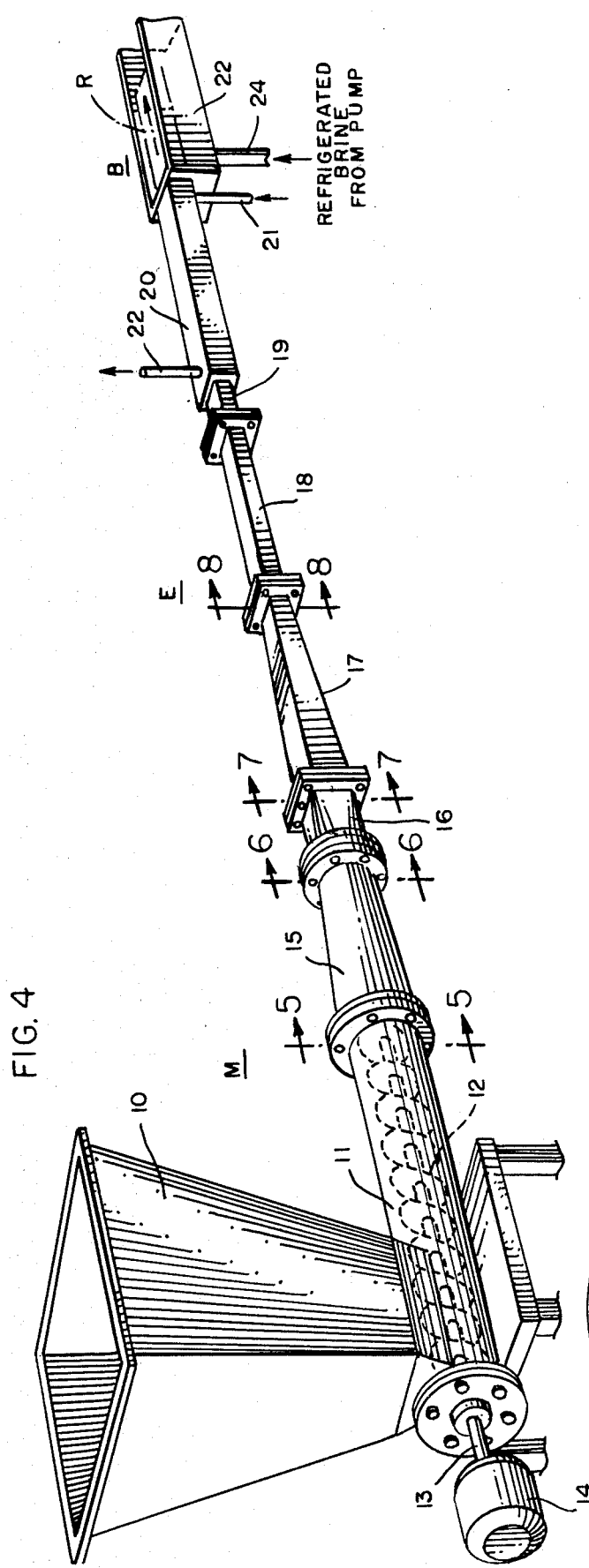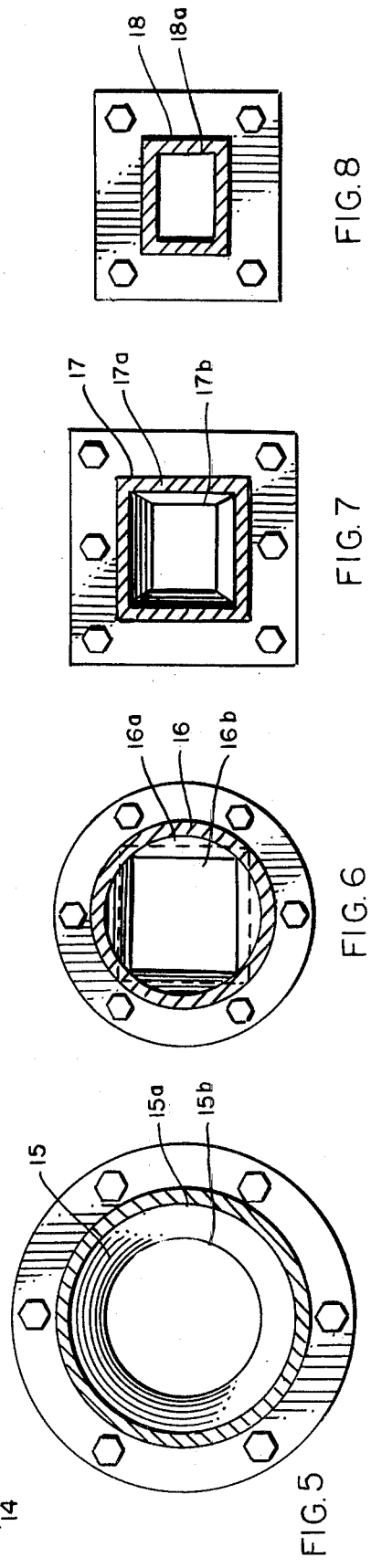

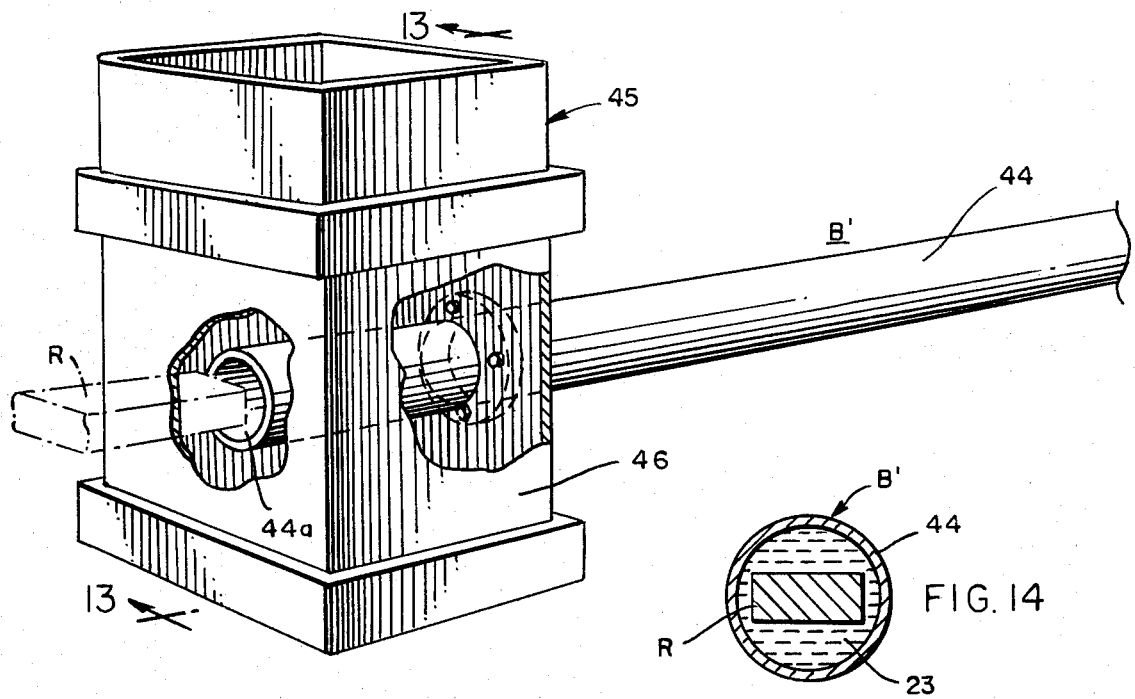
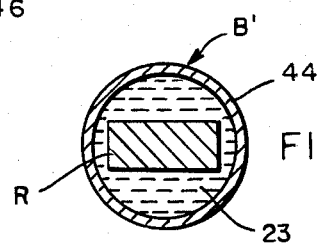
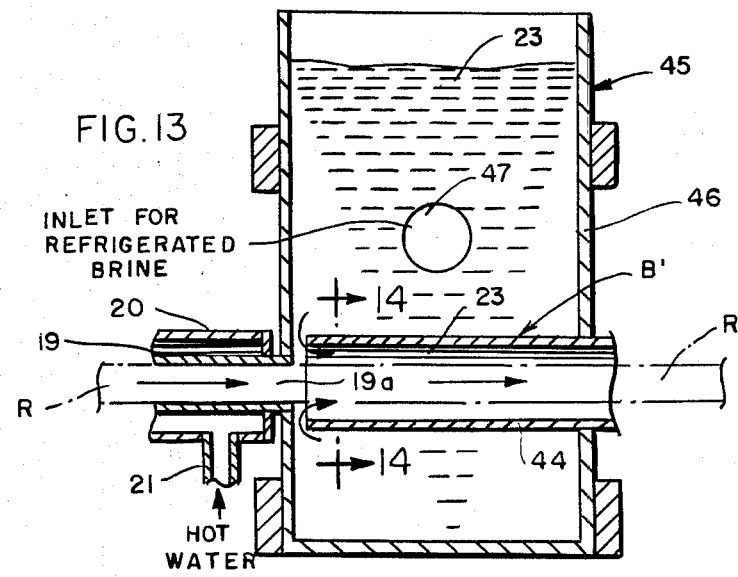

METHOD OF PREPARING PASTA FILATA CHEESE FOR BRINING AND CUTTING

BACKGROUND AND PRIOR ART

Pasta filata cheese, especially mozzarella, is produced in large quantities for making pizza and other Italian foods. Production methods and apparatus are described in U.S. Pat. Nos. 3,531,297, 3,713,220 and 3,961,077. In the processes disclosed in these patents, a continuous mixing apparatus is utilized to mix the cheese curd and impart the desired stringy character to the cheese. The continuous mixer apparatus is described in detail in U.S. Pat. No. 3,713,220. As indicated in that patent, the mixed cheese may be extruded to a molding station. Heretofore, in commercial production, the cheese has been molded in individual boxes and considerable hand labor has been required. After the blocks of cheese are removed from the mold boxes, they are subjected to salting in a brine soak tank. A brining apparatus may be provided through which the blocks of cheese are moved continuously, as described in U.S. Pat. No. 4,068,014.

Systems exist for continuous extrusion, cutting, and brining of the cut cheese sections, but heretofore no such system has been developed for commercial use. In U.S. Pat. No. 3,961,077 (cited above) an elongated molder extruder is illustrated as being connected to the mixer apparatus, which discharges to a cutter above a conveyor. The cut cheese blocks are carried by the conveyor to the brine tank. In U.S. Pat. No. 3,481,747, a molder extruder is shown discharging downwardly into a brine soak tank. The blocks of cheese are illustrated as being cut at the outlet from the extruder, and fall into the brine tank through which they are moved by a continuous belt conveyor located either in the bottom portion of the tank or above the brine tank. Such systems, however, must operate on a discontinuous basis, that is, it appears to be necessary to interrupt the extrusion during each cutting operation if uniform cheese blocks are to be obtained. Such uniformity is particularly important where the cheese is to be sold in exact size packages, such as home use packages of 8 or 16 ounce sizes. Where such amounts of cheese are cut from larger molded blocks there is a large amount of cutting waste if exact weights are produced.

SUMMARY OF INVENTION

The present invention provides the method and apparatus for the continuous extrusion of pasta filata cheese in a form which is adapted for continuous brining and cutting, and which can be utilized to produce packaged cheese of predetermined weights. Mixed warm pasta filata cheese is extruded in a continuous ribbon which is projected into an elongated channel having a cold brine flowing therethrough in the direction of movement of the ribbon. The brine has a density and a velocity assisting the movement of the ribbon through the channel. At the discharge end of the channel, mechanical means is provided for continuously removing the ribbon from the channel for cutting and brining. The removal means may consist of a gripper conveyor assembly which assists in directing and moving the cheese ribbon through the brine channel. Other features of the method of the apparatus used in carrying it out will be described in the following specification.

By employing the method and apparatus of this invention, a pasta filata cheese such as mozzarella cheese can be packaged on the same day it is manufactured. The continuous operation reduces the amount of labor required for handling the cheese, and an improvement in the uniformity and reliability of the cheese is obtained. Very high plant production capacities are obtainable, and the brined cheese ribbons can be readily cut into sizes of substantially exact weights, such as retail packages of 8 or 16 ounces, without cutting waste.

THE DRAWINGS

The method and apparatus of this invention is illustrated by the accompanying drawings in which:

FIG. 1 is a small scale plan view of a complete plant system for extruding, cutting, brining, and packaging pasta filata cheese blocks which includes apparatus for carrying out the method of this invention;

FIG. 2 is an enlarged plan view of the apparatus system of FIG. 1 showing in greater detail the apparatus of the present invention;

FIG. 3 is a sectional view taken on line 3—3 of FIG. 2 showing the extruded cheese ribbon within the brine-filled channel which receives the ribbon on extrusion;

FIG. 4 is a perspective view of a continuous extrusion and molding unit which discharges the cheese ribbon into the brine channel;

Figure 9:
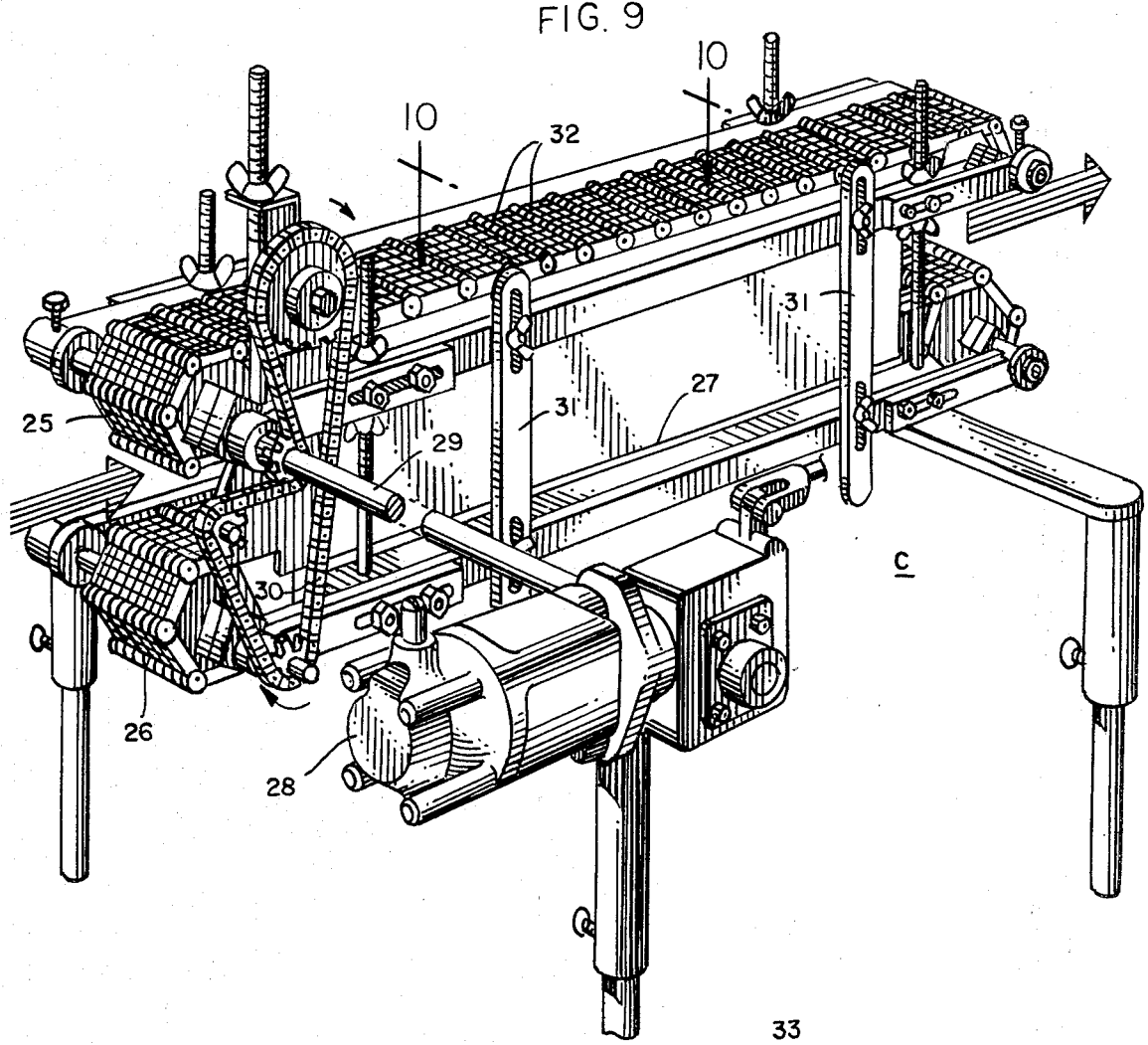
Figure 10:
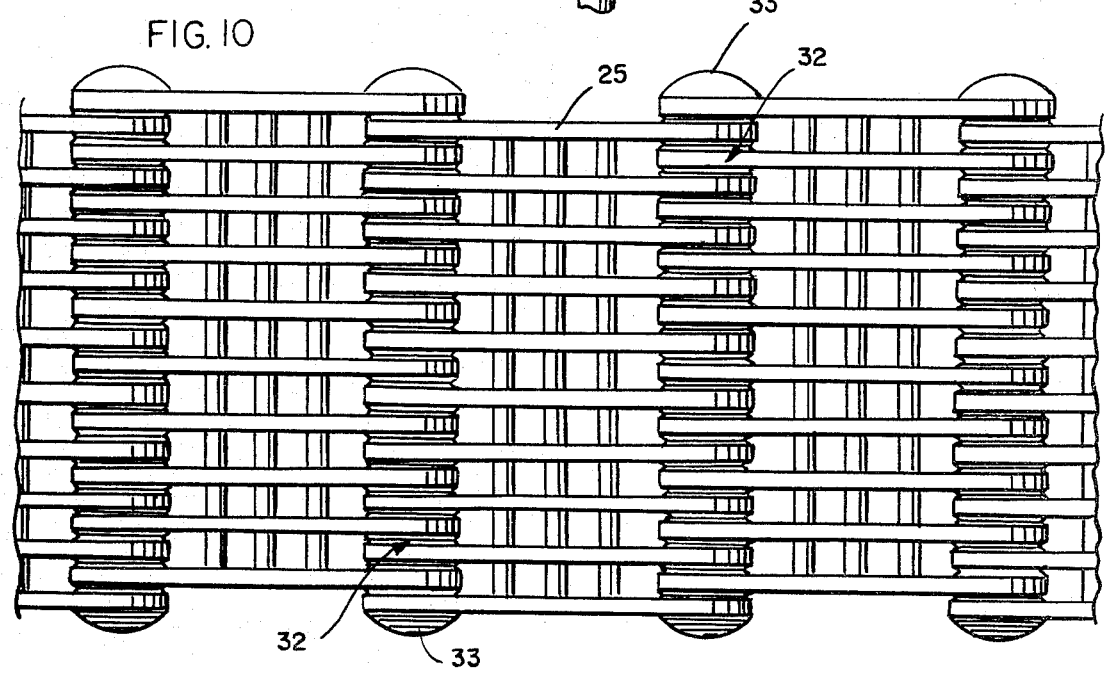
Figure 11:
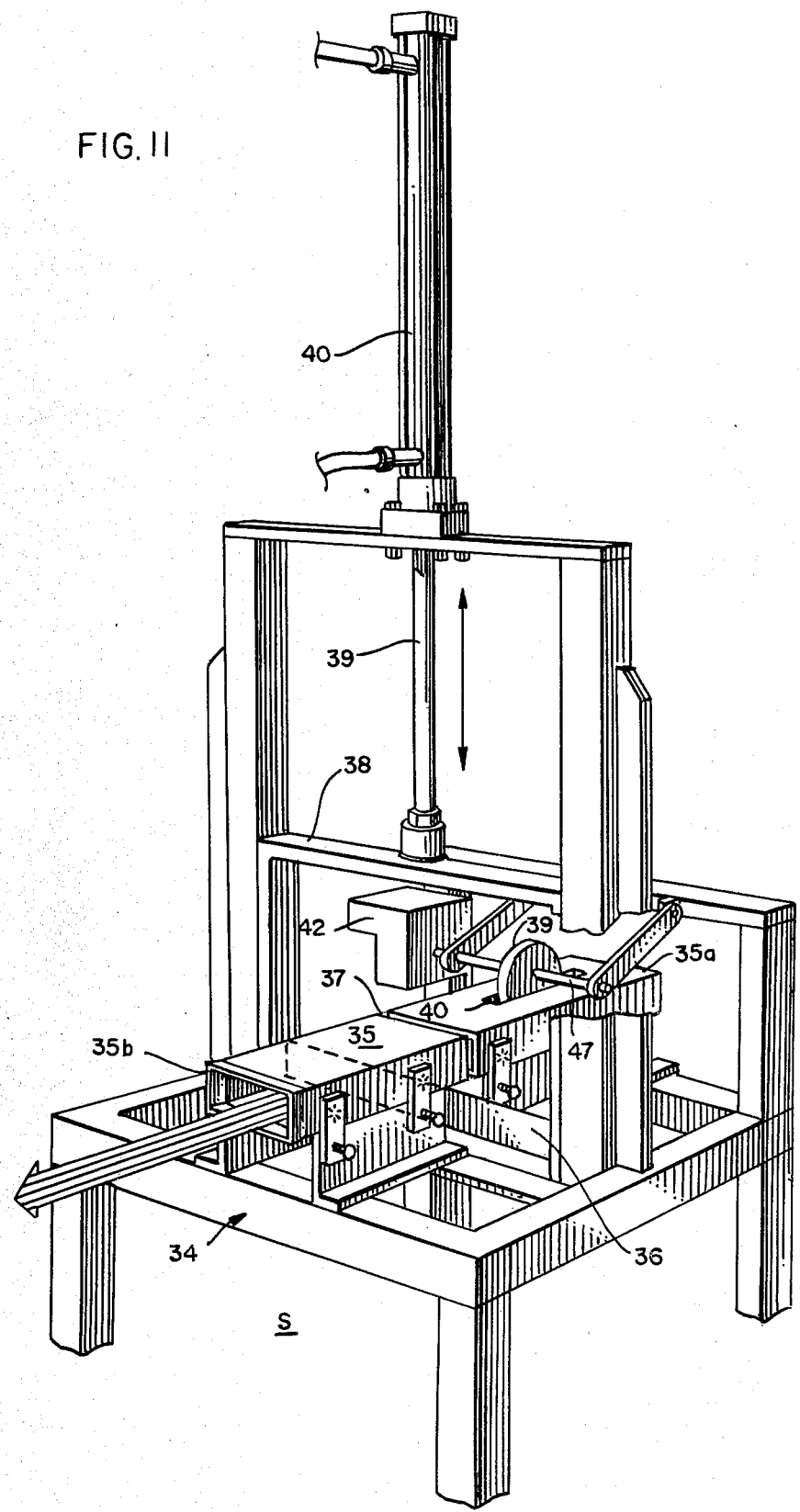

FIGS. 5, 6, 7 and 8 are respectively cross sectional views of the molding unit taken on line 5—5, 6—6, 7—7 and 8—8 thereof;

FIG. 9 is a perspective view of a gripper-type conveyor for removal of the ribbon from the channel into which it is extruded;

FIG. 10 is a detailed plan view of a section of the upper conveyor belt of the apparatus of FIG. 9;

FIG. 11 is a perspective view of a cutter apparatus to which the conveyor of FIG. 9 supplies the cheese ribbon for initial cutting into long strands;

FIG. 12 is a perspective view of a modified assembly for supplying the extruded ribbon and chilled brine to a tube providing the channel through which the ribbon initially passes;

FIG. 13 is a sectional view of the ribbon feeding apparatus of FIG. 12 taken on line 13—13 thereof; and FIG. 14 is a cross sectional view showing the brine-filled tube with the extruded cheese ribbon therein.

DETAILED DESCRIPTION

Looking first at FIGS. 1 and 2, there is shown a plant system for processing mixing pasta filata cheese into packaged cheese blocks or cakes on a continuous basis. A molder (M) extrudes warm mixed pasta filata cheese through a shaping extruder assembly (E) into a brine-filled channel (B). The extruded cheese ribbon (R) passes through the channel (B) together with circulating chilled brine. The ribbon (R) is removed from the discharge end of the channel by a mechanical gripper conveyor (C), which assists the movement of ribbon (R) through the channel (B) and feeds it to an initial cutting station (S). The cut lengths of the ribbon (R) are introduced into a large brine soak tank (T) and moved therethrough from the feed end to a discharge end after completion of the brine soaking. The brine lengths of cheese are removed from tank (T) onto a conveyor (D), which transports the length to a cutting and packaging station (P). Since the details of construction of the brine tank (T), the discharge conveyor (D), and the cutting and packaging station (P) may be conventional, and are not part of the present invention, they will not be described in detail herein. However, as indicated in FIG. 1, the brine tank (T) may be supplied with an overhead spray apparatus (A) for applying brine to the top of the cut lengths of cheese (L), which are floating on top of the brine in the tank (T), as they move therethrough.

In accordance with the present invention, the extruded continuous ribbon of pasta filata cheese [viz. ribbon (R)] is projected into the feed end of an elongated channel of restricted cross section ]viz. the channel (B)]. The channel has a cold sodium chloride brine flowing therethrough in the direction of movement of the ribbon in the channel. For example, as shown in FIG. 3, the channel (B) may be provided by an elongated narrow open-top chute pen through which the brine (11) flows with the cheese ribbon (R) therein. Where the brine in the channel has substantially the same or a slightly lower density than the cheese ribbon, the ribbon (R) will move therethrough near the surface of the brine (11), as shown in FIG. 3. The desired operating conditions for the brine will be discussed in more detail below.

Looking now to FIGS. 4 to 8, the construction of the molder (M) and the shaper-extruder (E) is shown in more detail. In this embodiment, the molder is provided with a hopper (10) into which is introduced mixed warm pasta filata cheese. For example, the cheese curd, such as mozzarella cheese curd, at the proper pH for mixing and stretching [viz. pH 5.2 to 5.4] is subjected to mixing and stretching in a mixer apparatus such as that shown in U.S. Pat. No. 3,713,220. The mixed and stretched curd provides a plastic cheese for further processing, which may be at a temperature within the range from 120° to 160° F. For example, a preferred temperature is from about 135° to 145° F. The warm plastic cheese is discharged from the mixer into the hopper (10) for further processing.

Hopper (10) discharges the cheese into the feed end of a tubular housing (11) containing a single screw auger (12) mounted on a shaft (13) driven by a motor (14) in a direction for forcing the plastic cheese forwardly into the shaper-extruder assembly (E). In the illustration given and preferably, the ribbon shaping assembly (E) includes a series of sections (15), (16), (17), (18) and (19). These sections function to form the plastic cheese to the desired cross sectional shape of the ribbon, which is preferably a rectilinear shape, such as a rectangular or square cross section. In the illustration given, the sections (15), (16) and (17) progressively decrease in cross sectional area in the direction of movement of the cheese and provide an initial circular cross section, an intermediate square cross section, and a final rectangular cross section. This progression is shown more clearly in FIGS. 5 to 8. Section (15) is conical, tapering from its feed end to its discharge end. The inlet cross section which receives the cheese from the auger (12) is indicated at (15a) in FIG. 5 and the reduced circular cross section at the outlet end is indicated at (15b). Section (16), as shown more clearly in FIG. 6, includes an inlet of circular cross section (16a) of the same size as outlet (15b) and converges to an outlet (16b) of square cross section. In section (17), the inlet (17a) has a square cross section corresponding to the outlet (16b), and converges to an outlet (17b) of rectangular cross section. Preferably, as shown, the cheese ribbon thus formed has a height substantially less than its width. The rectangular cross section ribbon has formed at outlet (17b) passes into section (18), which has a uniform rectangular cross section of the same internal dimensions as outlet (17b). In other words, as shown in FIG. 8, the internal cross section (18a) is the same as the cross section (17b), and the cheese ribbon passes through section (18) and into the final section (19) without substantial change in dimensions. Section (19) has a cross section the same as that of section (18), and therefore is not illustrated in cross section. As shown in FIG. 4, a water heating jacket (20) may be provided around the outlet portion of section (19), including a heated water inlet (21) and a water outlet (22). The outlet end or discharge orifice of section (19) communicates with the inlet end of the channel-providing chute (22) to which refrigerated brine (23) is supplied through inlet pipe (24). Preferably, as indicated, the brine is supplied by a pump from a brine refrigeration unit. As indicated in FIG. 2, the brine may be removed from the discharge end of chute (23) through a pipe (25) for recirculation through the refrigeration unit and back to the brine inlet (24).

The brine which is circulated through the channel provided by chute (23) performs several functions. It should be at a temperature which rapidly chills and sets the extruded cheese ribbon. For example, the brine can be at a temperature of from 5° to 30° F., or preferably at a temperature in the range of about 5° to 20° F. The brine may be substantially saturated, although it is preferred to use brine which is not fully saturated so as to avoid precipitation of salt in chute (23) or during the recycling of the brine for refrigeration. In relation to the density of the cheese ribbon, the brine should contain sufficient salt so that a buoyant action is provided. In a preferred embodiment, the density of the brine can be the same or slightly less than the density of the cheese. The cheese ribbon will then tend to float in the brine near the surface, as shown in FIG. 3. This density relationship is preferred over that in which the brine has a higher density, causing the ribbon to be only partially submerged, or a density less than that of the cheese so that it begins to sink and move along the bottom of chute (22). However, as long as the brine provides sufficient chilling for the extruded ribbon, and flows with the ribbon through the channel, some of the advantages of the present invention are obtained. More specifically, the brine may contain from about 5 to 20% sodium chloride by weight. In a preferred embodiment, the brine contains from 8 to 17% sodium chloride.

As the brine flows through the brine channel (B) from the inlet to the outlet end, it tends to carry the ribbon along with it, thereby assisting the movement of the ribbon through the channel. To maximize this effect, it is preferred that the brine have a velocity through the channel substantially greater than the speed of the ribbon. For example, the velocity of the brine as it flows through the channel with the ribbon therein may range from 100 to 600 feet per minute, while the cheese ribbon moves at a speed of from 10 to 80 feet per minute. It will be understood that the velocity of the brine through the channel will be less when the ribbon is not within the channel, since the presence of the ribbon reduces the brine flow cross section of the channel. It is therefore the velocity of the brine with the ribbon in the channel that is the important consideration. In a preferred embodiment, a brine velocity of from 200 to 500 feet per minute can be used, and the ribbon may have a speed through the channel of from 20 to 60 feet per minute.

The conveyor (C) for removing the cheese ribbon (R) from the brine flow channel (B) is preferably a gripper-type conveyor. More specifically, the ribbon removal means may comprise a pair of endless conveyor belts mounted for gripping and drawing the cheese ribbon therebetween out of the channel. One suitable conveyor apparatus for this purpose is shown in FIG. 9. It consists of a pair of endless articulated belts (25 and 26) which are mounted on a support frame assembly (27) and driven by a motor (28) through shaft (29) and chain-drive (30) in the direction indicated by the arrow in FIG. 9, which is the direction of ribbon movement through brine channel (B). As shown, the space between the belts (25 and 26) can be varied by means of the adjustment bars (31). The belts provide longitudinally spaced gripping ribs (32) through which extends pivot pins (33), as shown more clearly in FIG. 10. With proper adjustment of the space between the belts, their action is to firmly grip the top and bottom surfaces of ribbon (R) without compressing or changing the dimensions of the chilled ribbon. The action of the conveyor assembly (C) is therefore not only to remove the ribbon (R) from the brine channel (B) but also to assist the movement of the ribbon through the channel. The brine flow through the channel combined with the action of the conveyor thereby assures a smooth continuous movement of the ribbon through the channel without any undue snaking or kinking of the ribbon. The conveyor (C) can also be employed for transferring the chilled ribbon to an initial cutting station (S), as illustrated in FIGS. 1 and 2.

A suitable cutter apparatus is illustrated in FIG. 11. It includes a frame (34) on which is mounted a channel member (35) having an internal cross section of similar shape to the ribbon (R) but being oversize with respect thereto. For example, as shown, the ribbon may be introduced into the feed end (35a) of the channel and passed therethrough for discharge through the outlet end (35b). The movement of the ribbon therethrough can be continuous. In the illustration given, a double acting cutter blade (36) reciprocates upwardly and downwardly through the slot (37) intermediate at the ends of channel member (35). It will be understood that blade (36) has sharpened top and bottom edges so that it will cut cleanly in either direction. Blade (36) is supported on the lower end of a slidable carrier (38) which is actuated through rod (39) by means of hydraulic cylinder (40). For timing the cuts, a counterwheel (39) extends through a slot (40) so that it will ride on top of the cheese ribbon and be rotated thereby. Wheel (39) thereby turns shaft (41) which connects to an electrical counter mechanism (42). Counter mechanism (42) can be set to actuate the cutter blade (36) at a selected number of rotations of wheel (39), thereby establishing a length for the cut sections of the ribbon. Relatively long cut sections are preferred, such as sections of from 30 to 50 feet in length. These sections after brine chilling in tank (T), as previously described, are transferred by the discharge conveyor (D) to the final cutting and packaging at station (P). In connection with the final cutting and packaging, the ribbon lengths will be cut to short sizes, such as 6 to 18 inches in length.

In FIGS. 12 to 14 there is illustrated a modification of the channel assembly for conveying the extruded ribbon, which is designated as a modification by the letter B'. In this design, the channel-providing means is an enclosed tube (44) and there is provided an assembly (45) for introducing the brine into the feed end (44a) of the tube. Assembly (45) comprises a vertically extending brine feed box (46). As shown, box (46) has an open top and provides a fluid tight enclosure. Tube (44) extends through one wall of the box and terminates at a spaced distance from the opposite wall, as shown more clearly in FIG. 13. The brine feed box (46) receives the cheese ribbon (R) from the outlet or orifice (19a) of the extruder section (19) which is enclosed by the water jacket (20). By circulating hot water through jacket (20), the cheese may be maintained in plastic, flowable condition as it exits through orifice (19a). As previously stated, desirable temperatures are in the range from 120° to 160° F.

As shown in FIG. 13, the end portion of tube (44) within box (46) is in alignment with extruder section (19) and orifice (19a), while being spaced from the wall containing the orifice (19a). The ribbon (R) is projected into the free end of tube (44) and flows therethrough together with brine (23), which is introduced into box (46) through brine inlet (47), and flows into the open end of tube (44), as indicated by the arrows in FIG. 13. It will be understood that the brine introduced through inlet (47) will be of a character previously described, as to temperature and density or salt content. It can be refrigerated recycled brine, as previously described.

Preferably, as shown in FIGS. 12 and 13, box (46) extends above the level of tube (44) and provides a space therein for maintaining a head of brine above tube (44). Where the brine is supplied under pump pressure through inlet (47), box (46) can also act as a search tank. Variations in the level of the surface of the brine within box (46) will not effect the operation of the apparatus, as long as there is a level of the brine above the inlet to tube (44). The hydrostatic head provided by holding a level of brine within box (46) above tube (44) will promote the flow of the brine into the open end of tube (44) for movement therethrough with ribbon (R). The appearance of the ribbon (R) within the tube (44) is illustrated in FIG. 14. As previously described, the flow rate of the brine through tube (44) is preferably at a substantially higher velocity than the speed of ribbon (R). However, this is not essential for effective operation, providing sufficient brine is circulated through the channel to adequately chill the extruded ribbon.

EXAMPLE

Mozzarella cheese is produced by the stored curd process as disclosed in U.S. Pat. No. 3,961,077. After the curd has reached the proper pH for mixing (pH 5.2 to 5.4), it is warmed to a suitable mix temperature (135°–145° F.) and mixed in a mixer apparatus like the one disclosed in U.S. Pat. No. 3,713,220. The warm mixed curd at a temperature of 135°–145° F. is introduced into the chute (10) of the molder apparatus described with reference to FIGS. 1 to 8. A continuous cheese ribbon is formed, such as a ribbon having a width of 2¾ with 1⅜ thickness. This ribbon at a temperature of 135°–145° F. is extruded into an open topped chute like channel-providing chute (22). The chute has interior dimensions of approximately 4 inches by 4 inches, which comprises the dimensions of the brine-flow channel. The chute and channel provided thereby have a length of 80 feet, and the cheese ribbon is extruded at a speed of 40 feet per minute, thereby taking approximately two minutes to pass through the channel. A brine containing 10% salt by weight at a temperature of approximately 10° F. is circulated through the channel at a rate of from 200 to 300 gallons per minute. With the ribbon in the channel, the velocity of the brine at 200 gallons per minute will be approximately 320 feet per minute, and 480 feet per minute at a flow rate of 300 gallons per minute. The cheese ribbon is bouyed by the brine and is carried along through the channel by the velocity of the brine to the discharge end of the channel where it is removed by a gripper-type conveyor, such as the one illustrated in FIG. 9. The conveyor supplies the cheese ribbon to a cutter, such as the one illustrated in FIG. 11, and the ribbons are cut into lengths of approximately 80 feet. The 80 foot lengths of chilled cheese are introduced into a brine soak tank. The tank contains saturated brine at about 45° F. The brining is completed in about 15 to 20 minutes, and the brined ribbon lengths are removed from the brine tank, transferred by a conveyor to a cutting and packaging station. The cheese is then cut into apropriate lengths to provide packages of predetermined size, such as packages containing 8 ounces or 16 ounces of cheese.

It will be understood that the size of the extruded ribbon and the final cheese packages may be varied widely. For example, the width of the ribbon may vary from 1.5 to 7 inches, and the height from 0.75 to 4 inches. The length of the blocks of cheese as finally packaged may range from 5 to 12 inches, and the package weights may range from 8 ounces to 5 pounds.

I claim:

1. The method of preparing pasta filata cheese for brining and cutting, comprising:
    (a) extruding mixed warm pasta filata cheese in a continuous ribbon;
    (b) projecting said extruded ribbon into the feed end of an elongated channel of restricted cross section having a cold sodium chloride brine flowing therethrough in the direction of movement of said ribbon in said channel, said brine being at a temperature sufficient to rapidly chill and set the extruded cheese ribbon and having predetermined density and velocity to assist the movement of said ribbon through said channel from said feed end to an outer discharge end; and
    (c) continuously mechanically removing the outer end of said ribbon from said discharge end of said channel for cutting and brining.

2. The method of claim 1 in which said brine is at a temperature of from 5° to 30° F. and contains from 5 to 20% sodium chloride by weight.

3. The method of claim 1 in which said brine has a velocity of from 100 to 600 feet per minute and said cheese moves through said channel at a speed of from 10 to 80 feet per minute.

4. The method of preparing pasta filata cheese for brining and cutting, comprising:
    (a) extruding mixed warm pasta filata cheese in a continuous uniform ribbon of rectilinear cross section;
    (b) projecting said extruded ribbon into the feed end of an elongated channel of restricted cross section for movement therethrough from said feed end to an outer discharge end at a speed of from 10 to 80 feet per minute, said channel having a sodium chloride brine flowing therethrough in the direction of movement of said ribbon in said channel, said brine having a temperature of 5° to 30° F., a sodium chloride concentration of 5 to 20% by weight, and a velocity of from 100 to 600 feet per minute; and
    (c) continuously mechanically removing the outer end of said ribbon from said discharge end of said channel for cutting and brining.

5. The method of claim 4 in which said brine has a temperature of from 5° to 20° F. and contains from 8 to 17% sodium chloride by weight.

6. The method of claim 4 in which said brine has a velocity of from 200 to 500 feet per minute and said cheese moves through said channel at a speed of from 20 to 60 feet per minute.

7. The method of claim 4 in which said cheese is extruded at a temperature of from 120° to 160° F.

8. The method of preparing pasta filata cheese for brining and cutting, comprising:
    (a) extruding mixed pasta filata cheese at a temperature of from 120° to 160° F. in a continuous uniform ribbon of rectilinear cross section;
    (b) projecting said extruded ribbon into the feed end of an elongated channel of restricted cross section for movement therethrough from said feed end to an outer discharge end at a speed of from 20 to 60 feet per minute, said channel having a cold sodium chloride brine flowing therethrough in the direction of movement of said ribbon in said channel, said brine having predetermined density and velocity to assist the movement of said ribbon through said channel; and
    (c) continuously mechanically removing the outer end of said ribbon from said discharge end of said channel for cutting and brining.

9. The method of claim 8 in which said brine is at a temperature of from 5° to 20° F. and contains from 8 to 17% sodium chloride by weight, and said brine has a velocity through said channel of from 200 to 500 feet per minute.

* * * * *